United States Patent [19]

Sawby

[11] 4,249,685
[45] Feb. 10, 1981

[54] JACK HOLDER

[76] Inventor: Kenneth J. Sawby, Box 520, Maple Creek, Saskatchewan, Canada

[21] Appl. No.: 83,064

[22] Filed: Oct. 9, 1979

[30] Foreign Application Priority Data

Apr. 19, 1979 [CA] Canada .................................. 325867

[51] Int. Cl.³ .......................... B60R 9/00; B60R 11/06
[52] U.S. Cl. ................................ 224/42.45 R; 70/58; 70/258; 280/289 L
[58] Field of Search ................ 224/273, 282, 42.03 R, 224/42.03 A, 42.42, 42.45 R; 280/289 A, 289 L; 296/37.1, 37.2, 37.3, 37.6; 211/4, 60 R, 607; 248/203; 70/58, 258

[56] References Cited

U.S. PATENT DOCUMENTS

| 1,927,922 | 9/1933 | Crum .................................... 296/37.2 |
| 2,567,680 | 9/1951 | Runsddorf ................. 224/42.45 R X |
| 2,631,766 | 3/1953 | Kelley ............................ 224/42.45 R |
| 2,649,191 | 8/1953 | McLaughlin ..................... 211/607 X |
| 3,604,228 | 9/1971 | Conlon ..................................... 70/58 |
| 3,643,810 | 2/1972 | Highberger ......................... 70/58 X |
| 3,831,892 | 8/1974 | Herman ................................ 211/4 X |
| 3,940,009 | 2/1976 | Szeles .............................. 296/37.6 X |
| 3,980,217 | 9/1976 | Yochum .......................... 211/607 X |

FOREIGN PATENT DOCUMENTS

| 1530572 | 9/1969 | Fed. Rep. of Germany .......... 296/37.2 |
| 566289 | 12/1944 | United Kingdom ........................ 70/58 |

Primary Examiner—Stephen Marcus
Attorney, Agent, or Firm—George H. Dunsmuir

[57] ABSTRACT

A jack holder for a jack of the type including a post and lifting elements includes an L-shaped base and cover; a hinge pivotally connecting the base and cover for movement between a jack-receiving or removing open position and a closed position in which the lifting elements of the jack are housed within the open-ended casing defined by the closed base and cover, and the jack post extends beyond the ends of the casing; flanges partially closing the open ends of the casing; and sealing strips connected to the flanges for closing the remainder of such open ends, the sealing strips having profiled free edges for forming a continuous seal around the jack post at each end of the casing for protecting the lifting elements from the atmosphere.

2 Claims, 4 Drawing Figures

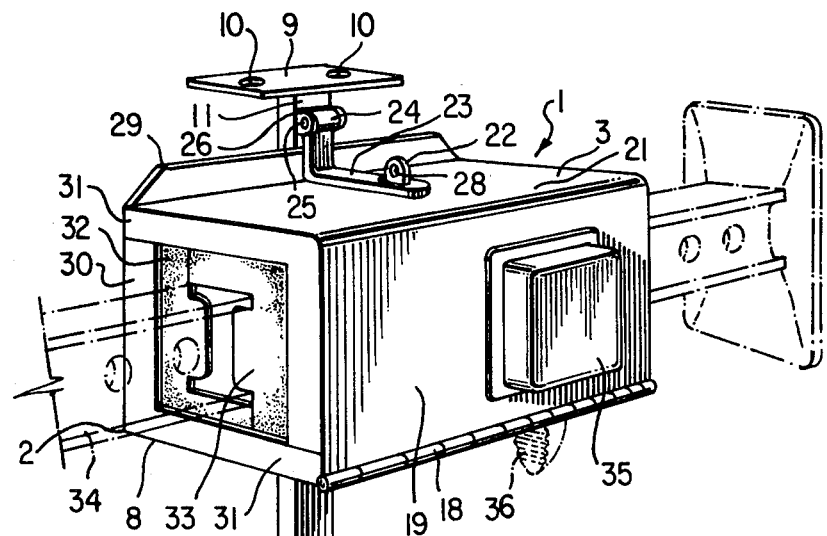
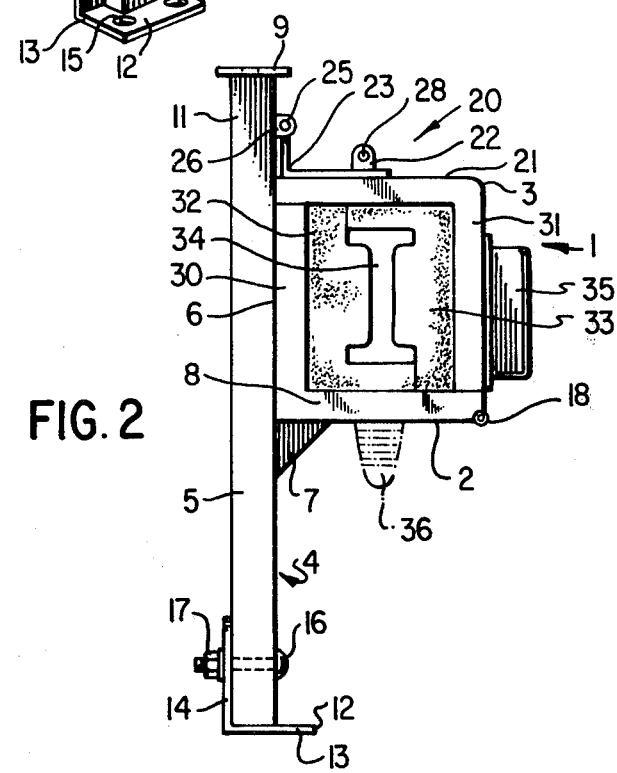
FIG.1
FIG.2

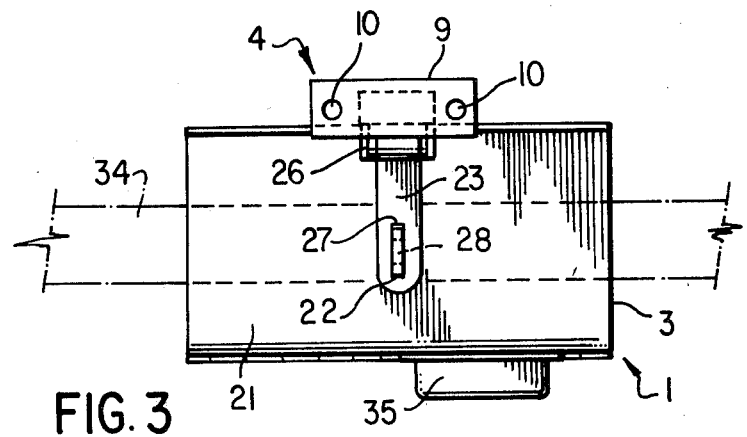
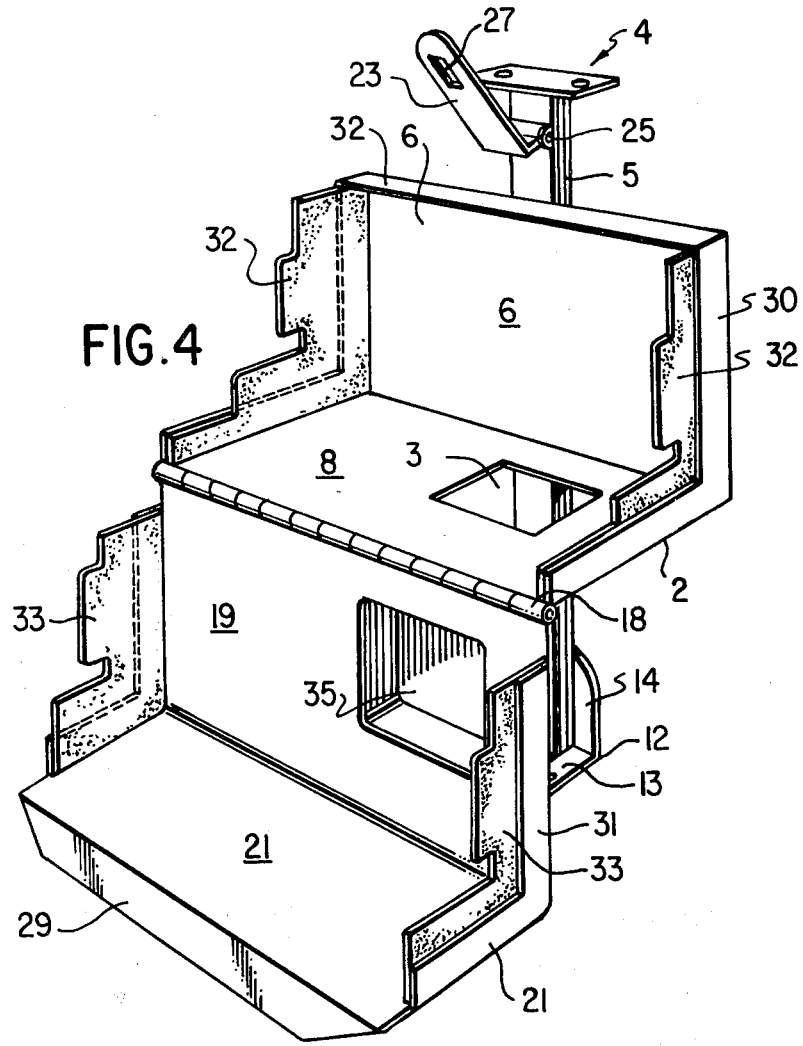

JACK HOLDER

BACKGROUND OF THE INVENTION

This invention relates to a jack holder, and in particular to a jack holder for use on small trucks and recreational vehicles.

Small truck owners in general do not use the jack supplied as an accessory with their truck since such standard jacks are of flimsy construction and lack stability at their maximum operating height. It is therefore common for a truck owner to purchase a second jack, for example a "Jackall" (Registered Trade Mark of J. C. Hallman and Company) jack, to more satisfactorily meet their requirements for tire changing operations, vehicle repairs and the lifting of heavy objects other than their vehicle. Such additional jacks are generally too bulky to store behind a truck seat, and because there is no luggage compartment or trunk in most small trucks, the jacks are usually left lying loose in the truck box. The jacks tend to rattle noisily, are often in the way, may be difficult to find when needed, and become dirty, clogged and/or damaged thus preventing proper functioning of the jacks.

Because of the requirements for compactness and maximum utilization of available space, recreational vehicles are usually equipped with a small compartment, typically in the rear of the vehicle, for storage of a jack. Often the compartment is covered by a spare tire and a bracket for holding the tire. Thus, it is difficult to gain access to the jack.

The jacks in question generally include a base, a post mounted on the base and a lifting assembly movable along the post. The jack holders for such jacks include first and second spaced apart brackets for retaining the base and post of the jack, a third bracket intermediate the first and second brackets, and a helical spring extending between the third bracket and the lifting assembly, so that movement of the lifting assembly along the post locks the jack in the storage position. A jack holder of this type is disclosed by U.S. Pat. No. 2,631,766, issued to N. T. kelley on Mar. 17, 1953. The Kelley jack storage structure or similar structures are still found in the trunks of many motor vehicles. The Kelley structure includes a mounting bracket connected at one end to a vertical wall of a vehicle compartment and at the other end to an L-shaped vehicle tire mounting bracket. The mounting bracket of the jack storage structure is notched for receiving the rod portion of a jack in the stored position. An anchor bracket secured to the floor of the trunk retains the base of the jack. A third bracket is secured to the trunk floor between the mounting and anchor brackets for receiving one end of a helical spring, the other end of which is detachably engageable with the lift member on the jack.

While the Kelley structure just described is useful in ordinary motor vehicles equipped with a trunk, the structure cannot be used on an exterior wall of a truck or recreational vehicle. A carrying structure that could be employed on an exterior wall of a truck or recreational vehicle is described in U.S. Pat. No. 2,248,170, which issued to R. G. Hansen on July 8, 1971. In its simplest form, the device disclosed by the Hansen patent includes a frame for mounting on an automobile, with a fixed semi-cylindrical clamp section in the frame, a co-acting semi-cylindrical clamp section movable in the frame, and a bolt for engaging the movable clamp section and moving it towards or away from the fixed clamp section. The portion of the frame carrying the movable clamp section is pivotally connected to the remainder of the frame which is connected to the automobile for opening and closing the frame. The clamp sections are lined with a yieldable material such as cork, rubber or felt.

The Hansen bracket device is intended to facilitate the carrying of poles or the like and is open at both ends. While the same or a similar structure could be used to carry jacks, the structure possesses the obvious disadvantage of leaving the movable lifting portions of the jack exposed to the elements.

The object of the present invention is to obviate or at least alleviate the above-mentioned difficulties and disadvantages by providing a relatively simple jack holder, which can be mounted on an exterior surface of a truck or recreational vehicle where it is readily accessible to the user, and which protects the movable portions of the jack from the elements.

SUMMARY OF THE INVENTION

Accordingly, the present invention relates to a jack holder for a jack of the type including post and lift elements movable along said post, said jack holder comprising a base section adapted to be mounted on the exterior wall of a motor vehicle for supporting the lift elements of the jack with the post therein; a cover section for covering the lift elements and a portion of the post of the jack; hinge means pivotally interconnecting said base and cover sections, and permitting movement of the cover section between an open position in which the jack can be placed on the base section, and a closed position in which the base and cover sections define an open-ended casing, with the cover section covering said lift elements and a portion of the post, with the post extending beyond the ends of said casing; flange means on each end of each of said base and cover sections partially closing both ends of said open-ended casing in the closed position of the casing; and flexible sealing means on said flange means closing the remainder of the ends of the casing and forming a continuous seal around the post of the jack at each end of the casing in the closed position of the casing.

BRIEF DESCRIPTION OF THE DRAWINGS

The invention will now be described in greater detail with reference to the accompanying drawings, which illustrate a preferred embodiment of the invention, and wherein:

FIG. 1 is a perspective view from one end and above of a jack holder in accordance with the present invention in the closed position, with a jack mounted therein;

FIG. 2 is an end view of the jack holder and jack of FIG. 1;

FIG. 3 is a plan view of the jack holder and jack of FIGS. 1 and 2; and

FIG. 4 is a perspective view from the other end and above of the jack holder of FIGS. 1 to 3, with the jack holder in the open position.

DETAILED DESCRIPTION

For the sake of simplicity, in the following description and appended claims, the expression "motor vehicle" is used in lieu of truck or recreational vehicle.

With reference to the drawings, the jack holder of the present invention includes a sheet metal casing generally indicated at 1 for mounting on an exterior wall of a motor vehicle (not shown). The casing 1 defined by an elongated base section 2, which is of generally L-shaped cross-sectional configuration, and an elongated cover section 3, which has an inverted L-shaped cross-sectional configuration. The two sections 2 and 3 in the closed position (FIGS. 1 to 3) define an open-ended casing. The casing 1 is mounted on the wall of the motor vehicle by means of a bracket generally indicated at 4. The bracket 4 includes a leg or bar 5 to which the rear wall 6 of the base section 2 is connected by nuts and bolts, welding or rivets (not shown). Triangular reinforcing gussets 7 extend between the bar 5 and the bottom wall 8 of the base section 2. A plate 9 with bolt holes 10 is provided on upper end 11 of the bar 5, and a foot 12 is connected to the lower end of the bar 5 for mounting the casing on the exterior wall of the vehicle. The mounting foot 12 is L-shaped with a horizontal bottom arm 13 extending outwardly beyond the sides of the bar 5 and a generally triangular vertical arm 14 extending upwardly behind the bar 5. Bolt holes 15 are provided in the arm 13 for connecting the boot to a lug or plate (not shown) on the vehicle. The vertical arm 14 of the mounting foot 12 is connected to the bottom end of the bar 5 by a bolt 16 and a nut 17 (FIG. 2). The hole (not shown) in the arm 14 for receiving the bolt 16 is in the form of a slot, so that the position of the mounting foot can be adjusted vertically.

The cover section 3 is pivotally connected to the base section 2 by means of a piano hinge 18 at the front, lower end of the casing 1 at the junction between bottom wall 8 of the base section 2 and front walk 19 of the cover section 3. A locking device generally indicated at 20 is provided on top wall 21 of the cover section 3 and on the upper end 11 of the bar 5. The locking device 20 includes a lug 22 extending upwardly from the top wall 21 of the cover section 3, and an arm 23 pivotally mounted on the upper end 11 of the bar 5. The arm 23 is generally L-shaped with a sleeve 24 at its rear top end for pivotally mounting the arm on a pin 25 extending between lugs 26 projecting forwardly from the upper end 11 of the bar 5. The front end of the arm 23 curves upwardly to facilitate grasping of the arm for releasing the cover section 3. A slot 27 is provided in the forward end of the arm 23, so that the latter can be forced downwardly over the rounded top end of the lug 22 to lock the cover section 3 in the closed position. An aperture 28 in the lug 22 permits the use of an ordinary combination lock or the like to positively lock the cover section 3 in the closed position to prevent the entry of moisture into the casing 1.

Flanges 30 and 31 extend inwardly from each end of the base and cover sections 2 and 3, respectively to partially close the ends of the casing 1 in the closed position. Sealing elements in the form of flexible rubber or plastic strips 32 and 33 are attached to the interior surfaces of the flanges 30 and 31, respectively. The inner surfaces of the strips 32 and 33 are profiled, so that, in the closed position of the casing 1, the strips 32 and 33 close the remainder of the open ends of the casing and form a continuous seal around a post or leg 34 of a jack mounted in the casing.

In the illustrated embodiment of the invention, a projection 35 is provided on the front wall 19 of the cover section 3 for accommodating outwardly extending portions of the lifting elements of the jack. Of course, the configuration of the cover section 3 and of the strips 32 and 33 can be altered to suit a variety of jacks. While lifting arm 36 projects through an aperture 37 in the bottom wall 8 of the base section 2, by employing a larger casing all of the lifting elements could be housed in the casing. With the jack arm 36 projecting through the bottom of the casing, when the casing is locked, the jack cannot be removed from the holder. Thus, theft of the jack is prevented or at least made very difficult.

Further modifications and alternative embodiments embodiments of the invention will be apparent to those skilled in the art in view of the foregoing description. Accordingly, the description is to be construed as illustrative only and is for the purpose of teaching those skilled in the art, the manner of carrying out the invention. It is understood that the form of the invention herewith shown and described is to be taken as the presently preferred embodiment. Various changes may be made in the shape, size and general arrangement of components. For example, equivalent elements may be substituted for those illustrated and described herein, parts may be used independently of the use of other features, all as will become apparent to one skilled in the art after having the benefits of the description of the invention and the appended claims.

What is claimed is:

1. A jack holder for a jack of the type including post and lift elements movable along said post, said jack holder comprising a base section adapted to be mounted on the exterior wall of a motor vehicle for supporting the lift elements of the jack with the post therein; a cover section for covering the lift elements and a portion of the post of the jack; hinge means pivotally interconnecting said base and cover sections, and permitting movement of the cover section between an open position in which the jack can be placed on the base section, and a closed position in which the base and cover sections define an open-ended casing, with the cover section covering said lift elements and a portion of the post, with the post extending beyond the ends of said casing; flange means on each end of each of said base and cover sections partially closing both ends of said open-ended casing in the closed position of the casing; and flexible sealing means on said flange means closing the remainder of the ends of the casing and forming a continuous seal around the post of the jack at each end of the casing in the closed position of the casing.

2. An apparatus according to claim 1, including bracket means connected to said base section for mounting the casing on an exterior wall of a motor vehicle; and a locking device interconnecting said cover section and said bracket means for locking the casing in the closed position.

* * * * *